(No Model.)
E. EMMERT.
ANIMAL TRAP.
No. 254,943. Patented Mar. 14, 1882.
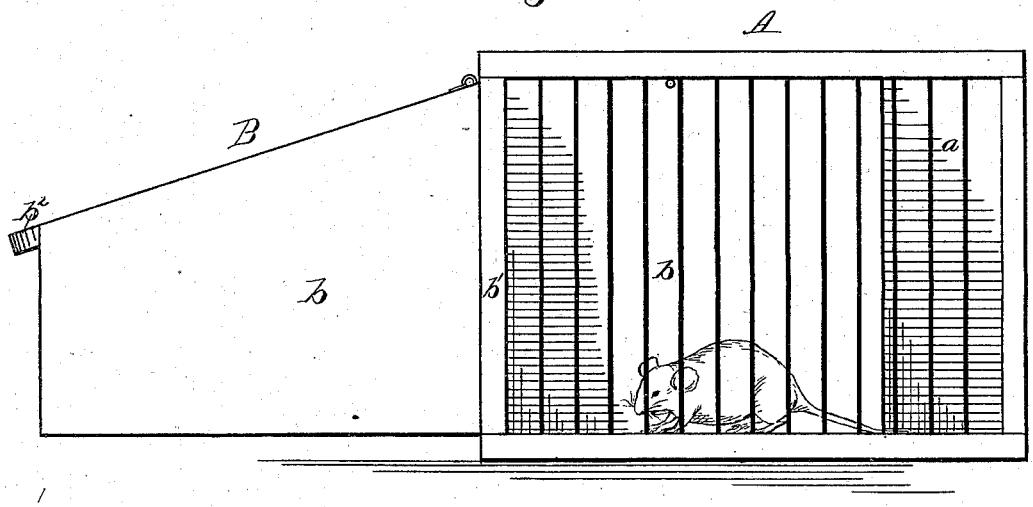
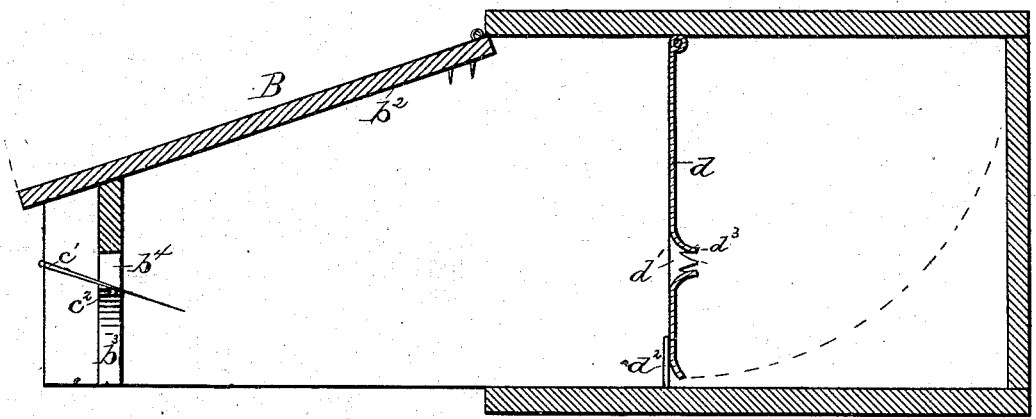
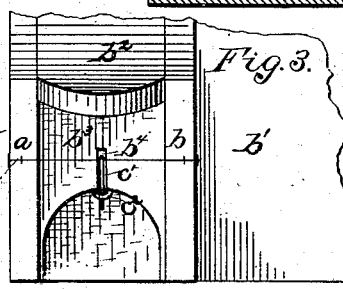
Witnesses:
J. W. Garner
W. S. D. Haines
Inventor:
Ezra Emmert
by Howard A. Snow,
attorney.

UNITED STATES PATENT OFFICE.

EZRA EMMERT, OF DIXON, ILLINOIS.

ANIMAL-TRAP.

SPECIFICATION forming part of Letters Patent No. 254,943, dated March 14, 1882.

Application filed December 29, 1881. (No model.)

*To all whom it may concern:*

Be it known that I, EZRA EMMERT, a citizen of the United States, residing at Dixon, in the county of Lee and State of Illinois, have invented certain new and useful Improvements in Animal-Traps, of which the following is a specification, reference being had therein to the accompanying drawings.

My invention relates to animal-traps; and it consists in the construction and arrangement of its several parts, as will be hereinafter fully set forth, and pointed out in the claims.

In the drawings, Figure 1 is a side elevation; Fig. 2, a vertical section; and Fig. 3 is a view of the opening.

A is a box. Its top and bottom pieces are of board, and two or more of the sides may be of wire, as shown. The side $a$ is of wood, and is extended beyond the box, forming the left wall of the entrance-tunnel B. The right wall of the tunnel is formed by the board $b$, which is secured to the side $b'$ of the box, and the space between the walls on the box is cut away and forms the entrance to the trap proper.

The roof of the tunnel is formed of the hinged board $b^2$, as shown. Placed between the walls of the tunnel near its inlet is the partition $b^3$. Its lower portion is cut away sufficiently to allow an animal to pass through, and extending from its upper end is the slot $b^4$, as shown. Stretched across the outer ends of the tunnel-walls is the wire $c$, and journaled thereon through its eye is the needle $c'$, which passes through the slot $b^4$, its point projecting downwardly, and held in position by the supporter $c^2$, as shown.

The right tunnel-wall $b$ extends within the box, as shown, and has pivoted between it and the side $a$ of the box the swinging partition $d$. This partition opens inwardly, and is provided with a perforation, $d'$. The stop-pin $d^2$ prevents the partition from swinging outwardly.

In operation, the animal enters the trap under the partition $b^3$, the needle rising as the animal passes under it. The bait is stuck upon the projections $d^3$ of the partition $d$, and the animal endeavoring to secure it will push the partition inwardly and imprison itself within the box. Should the animal, however, conclude to retire from the trap before passing the partition $d$, the point of the needle will prevent it and cause the said animal to hasten in the opposite direction, past the partition $d$, and into the trap.

What I claim is—

1. In an animal-trap, the automatically-acting needle $c'$, pivoted on the wire $c$, passed through the slot $b^4$ of the partition $b^3$, supported therein by the supporter $c^2$, and adapted to turn upon its pivotal point when the animal passes under its point in entering the trap, substantially as shown and described.

2. In an animal-trap, the tunnel B, projecting from the side of the box or trap, formed of the extended side board, $a$, and partition $b$, provided with a hinged roof, $b^2$, a recessed partition formed with a slot, $b^4$, adapted to form a guide for the needle, and a supporter adapted to retain the needle within the slot, substantially as shown and described.

3. In an animal-trap, the pivoted partition $d$, placed within the box between the sides $a$ and $b$, and having a perforation, $d'$, and projections $d^3$, substantially as shown and described.

4. In an animal-trap, the combination, with the slotted and recessed partition $b^3$, of the needle $c'$, pivoted to the wire $c$, and adapted to operate within the slot of the partition $b^3$, substantially as and for the purposes set forth.

In testimony whereof I affix my signature in presence of two witnesses.

EZRA EMMERT.

Witnesses:
FRANK B. SHELDON,
W. W. BETHEA.